United States Patent
Abd-El-Malek et al.

(10) Patent No.: US 9,507,648 B1
(45) Date of Patent: Nov. 29, 2016

(54) SEPARATE PLUG-IN PROCESSES IN BROWSERS AND APPLICATIONS THEREOF

(71) Applicant: Google Inc., Mountain View, CA (US)

(72) Inventors: John Abd-El-Malek, Sunnyvale, CA (US); Darin Fisher, San Carlos, CA (US); Mike Belshe, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/948,178

(22) Filed: Nov. 20, 2015

Related U.S. Application Data (63) Continuation of application No. 12/464,203, filed on May 12, 2009, now abandoned.

(60) Provisional application No. 61/093,440, filed on Sep. 1, 2008, provisional application No. 61/052,899, filed on May 13, 2008.

(51) Int. Cl.
G06F 9/46 (2006.01)
G06F 9/54 (2006.01)

(52) U.S. Cl.
CPC .................. *G06F 9/54* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 5,903,728 A * | 5/1999 | Semenzato | .............. | G06F 9/547 709/217 |
| 7,461,339 B2 * | 12/2008 | Liao | .................... | G06F 17/2264 715/234 |
| 7,484,225 B2 * | 1/2009 | Hugly | .................... | G06F 9/465 709/203 |
| 2001/0020255 A1 * | 9/2001 | Hofmann | ................ | G06F 9/541 719/318 |
| 2005/0193324 A1 * | 9/2005 | Purple | ............... | G06F 17/30905 715/273 |
| 2007/0038642 A1 * | 2/2007 | Durgin | .............. | G06F 17/30575 |
| 2008/0235710 A1 * | 9/2008 | Challenger | ........... | G06F 9/5027 719/316 |
| 2009/0288098 A1 * | 11/2009 | Abd-El-Malek | .. | G06F 17/30864 719/312 |

OTHER PUBLICATIONS

Grier, "Secure Web Browsing With the OP Web Browser," Mar. 5, 2008, accessed at http://imchris.org/research/grier_sp08.pdf, 15 pages.
Grier, "Secure Web Browsing With the OP Web Browser," Mar. 5, 2008, accessed at http://www.imchris.org/wp/2008/03/05/secure-web-browsing-with-the-op-web-browser, 2 pages.
Ioannidis, et al., "Building a Secure Web Browser," Proceedings of the Freenix Track USENIX Annual Technical Conference, Berkeley, CA, 2001, 6 pages.
Reis, et al., "Using Processes to Improve the Reliability of Browser-Based Applications," Dec. 2007, accessed at http://www/cs.washington.edu/homes/creis/publications.shtml, 13 pages.
Tierney, "Rambling on Plug-Ins," Feb. 1, 1997, accessed at http://www.stat.umn.edu/stat-lisp-news/msg00381.html, 3 pages.

\* cited by examiner

*Primary Examiner* — Dong Kim
(74) *Attorney, Agent, or Firm* — McDermott Will & Emery LLP (57) ABSTRACT

Embodiments of the present invention relate to browser plug-ins. In one embodiment, a system browses web content using a plug-in. The system includes at least one renderer process that detects plug-in content in the web content. Separate from the at least one tenderer process, the system also includes a plug-in process that includes the plug-in and communicates with the at least one renderer process to interpret the plug-in content using an inter-process communication channel.

21 Claims, 4 Drawing Sheets

SEPARATE PLUG-IN PROCESSES IN BROWSERS AND APPLICATIONS THEREOF

This application is a continuation of U.S. patent application Ser. No. 12/464,203, filed May 12, 2009, entitled "SEPARATE PLUG-IN PROCESSES IN BROWSERS AND APPLICATIONS THEREOF," which claims the benefit of U.S. Provisional Application No. 61/052,899, filed May 13, 2008, and U.S. Provisional Application No. 61/093,440 filed Sep. 1, 2008, the entire contents of each of which are incorporated by reference herein for all purposes.

BACKGROUND

1. Field of the Invention

Embodiments of the present invention relate to browser plug-ins.

2. Related Art

A browser is a software application that retrieves content and enables a user to interact with that content. In an example, a browser may retrieve content across one or more networks, such as the Internet. Types of browsers include the INTERNET EXPLORER, SAFARI, OPERA, and FIREFOX browsers. The content may include, for example, a web page, application, document, text, video, multimedia content, or any combination thereof. While the browser itself may be able to interpret some types of content, other types may require use of a specialized plug-in.

An application may access a plug-in to add features not built into the application itself. As mentioned earlier, a browser may access a plug-in to interpret content that it could not interpret on its own. For a browser to access the plug-in, the plug-in may implement a specified interface understood by the browser. Examples of plug-in interfaces include ActiveX, used by the INTERNET EXPLORER browser, and Netscape Plug-in Application Programming Interface (NPAPI) used by the SAFARI, OPERA, and FIREFOX browsers.

While using plug-ins can add functionality to a browser, using plug-ins can also cause stability and security issues. Plug-ins are often developed by third-parties and may not be subject to the same quality standards as a browser. For this reason, a plug-in may be more likely to crash than the browser. Yet, a crash in plug-in may bring down the entire browser. Further, plug-ins may be delivered in a machine code form that has direct access to system resources. If a plug-in includes malicious code, using the plug-in may cause damage to a computer system.

Systems and methods are needed that enable browsers to access plug-ins with increased security and stability.

BRIEF SUMMARY

Embodiments of the present invention relate to browser plug-ins. In one embodiment, a system browses web content using a plug-in. The system includes at least one tenderer process that detects plug-in content in the web content. Separate from the at least one renderer process, the system also includes a plug-in process that includes the plug-in and communicates with the at least one renderer process to interpret the plug-in content using an inter-process communication channel.

In another embodiment, a method browses web content on a computing device. The method includes the steps of: instantiating, on the computing device, at least one renderer process that detects plug-in content in the web content; instantiating, on the computing device, a plug-in process, separate from the at least one renderer process, that includes the plug-in; and sending data on an inter-process communication channel from the at least one renderer process to the plug-in process.

In a third embodiment, a computer program product has control logic stored therein and the control logic causes a computer to browse web content using a plug-in. The control logic causes the computer to instantiate at least one renderer process that detects plug-in content in the web content. The control logic also causes the computer to instantiate a plug-in process, separate from the at least one renderer process, that includes the plug-in. Finally, the control logic causes the computer to send data on an inter-process communication channel from the at least one renderer process to the plug-in process.

By having a separate plug-in process, embodiments increase the security and stability of a browser.

Further embodiments, features, and advantages, as well as the structure and operation of the various embodiments are described in detail below with reference to accompanying drawings.

BRIEF DESCRIPTION OF THE FIGURES

The accompanying drawings, which are incorporated herein and form a part of the specification, illustrate embodiments of the present invention and, together with the description, further serve to enable a person skilled in the pertinent art to make and use embodiments.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of the present invention relate to a browser with a separate process for plug-ins. In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "web content" as used herein refers to data that may be interpreted by a browser and plug-ins to perform a function. Examples of web content include a web page (e.g. HTML), application, document (such as an ADOBE document), video, multimedia content, Flash file or any combination thereof. Often, web content causes a browser to output information to a user. For example, a browser may display data or video or make sounds according to the web content. Some web content, such as an HTML form, accepts input from a user.

The term "plug-in content" as used herein refers to web content that requires a plug-in to interpret. For example, Flash files commonly require a Flash plug-in to interpret, and ADOBE documents commonly require an ADOBE READER plug-in to interpret.

The term "process" as used herein includes both a thread and an instance of a program having multiple threads of execution.

Figure 1A:
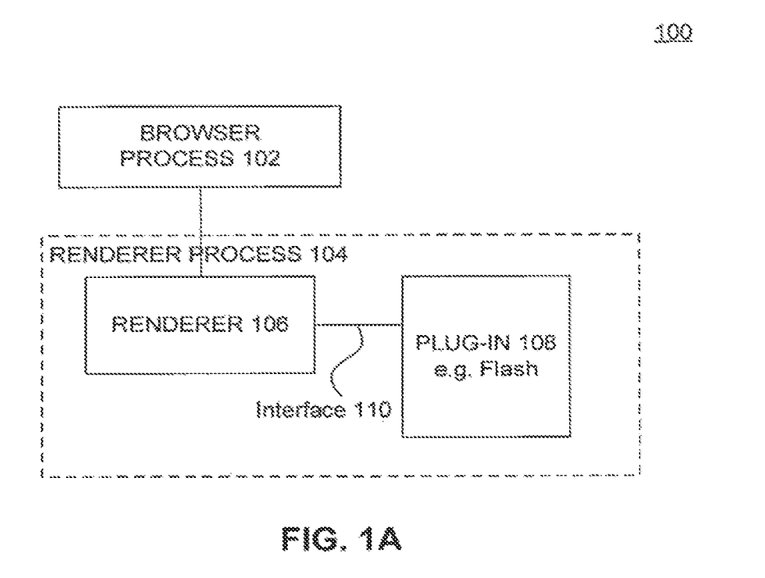
FIG. 1A is a diagram showing a browser system with a plug-in running within a renderer process.

FIG. 1A is a diagram showing a browser system 100 with a plug-in running within a renderer process. Browser system 100 includes a browser process 102 coupled to a renderer process 104.

Browser process 102 can communicate with one or more web servers (not shown) over one or more networks, such as the Internet, to retrieve web content. Browser process 102 can communicate with an input (not shown) to allow a user to input data, to input commands, or to provide other control information to browser process 102.

When browser process 102 retrieves web content, browser process 102 may request that renderer process 104 render the web content. Renderer process 104 includes a renderer 106 and a plug-in 108. Renderer 106 and plug-in 108 are software modules running in the same renderer process 104. Some of the web content, such as an HTML page, may be rendered by renderer 106. Interpreting other web content (referred to herein as plug-in content) may require plug-in 108. Plug-in 108 may be any type of browser plug-in, including but not limited to a Flash plug-in.

As shown in browser system 100, renderer 106 is coupled to plug-in 108 via an interface 110. Since plug-ins and browsers frequently have different developers, plug-in 108 may implement a standardized interface to communicate with renderer 104. As mentioned earlier, plug-in 108 may implement a variety of standardized interfaces, such as NPAPI or ActiveX.

While running plug-ins in the same process as the renderer has benefits, this architecture can be unstable. If plug-in 108 crashes, renderer process 104, including renderer 106, may crash. Effectively, at least an entire page may fail to render. In an alternative configuration where all the components of browser system 100 are consolidated into a single process, the entire browser system may crash. This issue is compounded by the fact that plug-ins are often provided by third parties. Third-party plug-ins may not have the same quality standards as the rest of the browser, and thus may be more likely to crash than the other browser components.

To deal with this instability, embodiments split the rendering implementation into two processes. A renderer process includes code for the rendering operations not requiring a plug-in, and a plug-in process includes a plug-in and code in support of the plug-in. When the plug-in process needs to communicate with the renderer process, or vice-versa, function calls may be marshaled and sent over a communication channel between the two processes. This architecture is depicted in FIG. 1B.

Figure 1B:
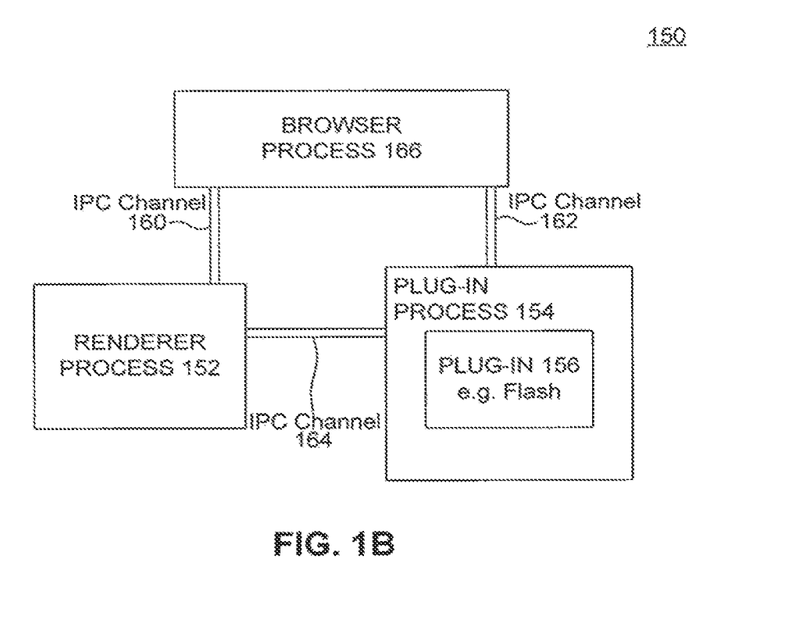
FIG. 1B is a diagram showing a browser system with a separate plug-in process according to an embodiment.

FIG. 1B is a diagram showing a browser system 150 with increased stability according to an embodiment. Browser system 150 includes a browser process 166, a renderer process 152, and a separate plug-in process 154. Plug-in process 154 includes a plug-in 156. As in FIG. 1A, browser process 166 retrieves web content and communicates with renderer process 152 to render the web content. Renderer process 152 may render some of the web content, such as, for example, an HTML page. However, renderer process 152 may not be able to render all the web content. Plug-in content, such as a Flash file, requires a plug-in to interpret.

If the web content includes plug-in content, renderer process 152 communicates with separate plug-in process 154 to interpret the plug-in content using plug-in 156. In this architecture, plug-in 156 crashing may bring down plug-in process 154, but renderer process 152 would continue operation. In an example, if a Flash plug-in fails, a Flash file may not render, but the remainder of the HTML page may render and operate fine. Thus, browser system 150 has greater stability in the face of potentially unstable plug-ins. Further, browser system 150 may have improved security because any malicious code in plug-in 156 is isolated in plug-in process 154.

The processes in browser system 150 communicate with each other using interprocess communication (IPC) channels. Browser process 166 communicates with renderer process 152 using an IPC channel 160; browser process 166 communicates with plug-in process 154 using an IPC channel 162; and renderer process 152 communicates with plug-in process 154 using an IPC channel 164. Each of IPC channels 160, 162, and 164 may be implemented using any type of interprocess communication, such as a shared memory, socket, or named pipe. A named pipe is a form of infer process communication known to those of skill in the art. A named pipe may allow two processes to communicate with each other without introducing additional threads. Furthermore, users or other software components may be able to configure a named pipe, including imposing security restrictions and controlling overall performance.

Browser system 150 may be implemented on any computing device that can support browsing. Such a computing device may include, but is not limited to, a computing device having a processor and memory for executing and storing instructions. Such a device may include software, firmware, and hardware. Software may include one or more applications and an operating system. Hardware can include, but is not limited to, a processor, memory and user interface display. Optional input devices, such as a mouse, a touch sensitive screen, or any future developed interaction method may be used. Example computing devices that can support web browsing include but are not limited to a computer, workstation, mobile device, set-top box, or cluster of computers.

Browser system 150 and its operation are described in more detail below with respect to FIGS. 2-4.

Figure 2:
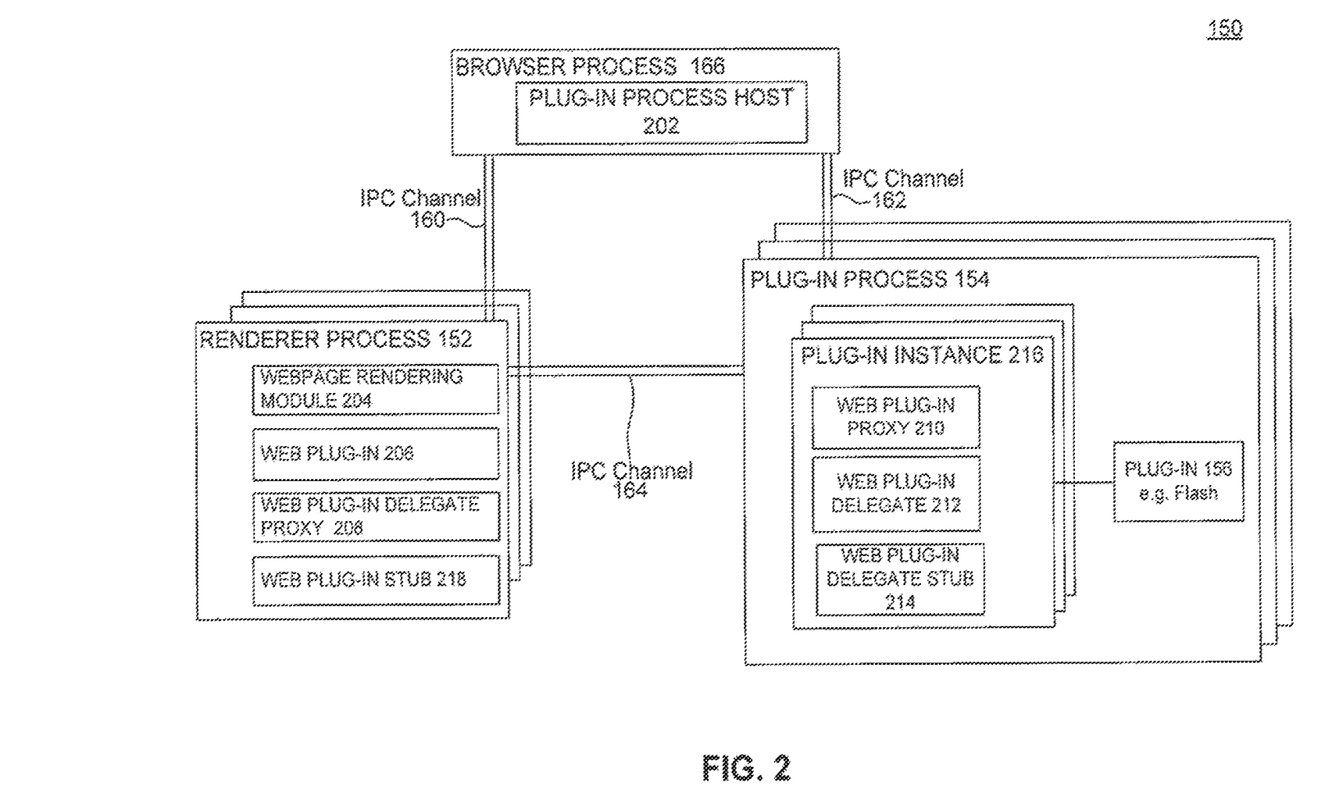
FIG. 2 is a diagram showing the browser system in FIG. 1B in greater detail.

FIG. 2 is a diagram showing browser system 150 in greater detail. As in FIG. 1B, browser system 150 includes browser process 166, renderer process 152, and plug-in process 154.

As mentioned earlier, browser process 166 retrieves web content and communicates with renderer process 152 to render the web content. Browser process 166 may maintain browser state information, such as session history and cookies. Further, browser process 166 also may help control coordination of the other processes and IPC communication channels. Browser process 166 may include a plug-in process host 202 that creates a plug-in process 154 and manages IPC channels. In an embodiment, plug-in process host 202 may instantiate renderer process 152 as well, for example, when a new page is retrieved. Alternatively, renderer process 152 and plug-in process 154 may be instantiated by other process host modules as would be apparent to those of skill in the art.

For example, if renderer process 154 needs to access plug-in 156, renderer process 154 sends a request for a handle to an IPC channel to browser process 166. If plug-in process 154 has not been instantiated, plug-in process host 202 instantiates it. Then, plug-in process host 202 sends a request to plug-in process 154 to open IPC channel 164. Plug-in process 154 sends a handle to IPC channel 164 to plug-in process host 202. Finally, plug-in process host 202 sends the handle to IPC channel 164 to renderer process 152 via IPC channel 160. Renderer process 152 may then use the handle to IPC channel 164 to communicate with plug-in process 154 which accesses plug-in 156. Establishing a connection to plug-in process 154 is described in more detail below with respect to FIG. 3.

As mentioned earlier, renderer process 152 renders some types of web content. For example, renderer process 152 may render HTML. Renderer process 152 may also execute some types of scripts embedded in the web content. For example, renderer process 152 may be able to execute JavaScript and VBScript embedded in the web content. FIG. 2 shows multiple instances of renderer process 152, one for each page. Having multiple instances of renderer process 152 is optional; however multiple instances may provide additional stability and increase an amount of processing work that can be carried out. With multiple instances, if one instance of renderer process 152 fails, the other instances may continue operation unaffected. In this way, if one page fails to render, other pages may continue unaffected.

Renderer process 152 may includes a webpage rendering module 204, a web plug-in 206, a web plug-in delegate proxy 208, and a web plug-in stub 218. Webpage rendering module 204 may be an application framework that provides some of core functions of browser system 150. For example, webpage rendering module 204 may maintain a data structure representing all or part of the web content displayed to a user on a page. Webpage rendering module 204 may also interpret and render some of the web content. For example, webpage rendering module 204 may parse and render HTML and XML. Webpage rendering module 204 also may execute some scripts embedded in the web content, such as JavaScript. When webpage rendering module 204 encounters plug-in content in the web content, webpage rendering module 204 may call web plug-in 206 to interpret the plug-in. Webpage rendering module 204 can include, but is not limited to, WebKit available at http://webkit.org/.

Web plug-in 206 may implement an interface known to webpage rendering module 204. In an example, web plug-in 206 may inherit from a C++ object. In another example, web plug-in 206 may implement a Java interface. Web plug-in 206 may abstract access to plug-in 156 for webpage rendering module 204. While access to plug-in 156 requires communication to another process, web plug-in 206 abstracts the inter-process communication so that webpage rendering module 204 does not have to be aware of where plug-in 156 is located. To communicate with plug-in process 154, web plug-in 206 accesses web plug-in delegate proxy 208 and web plug-in stub 218.

Web plug-in stub 218 assists in abstracting plug-in 156. Web plug-in stub 218 is used when the plug-in process 154 needs to communicate with webpage rendering module 204. Plug-in process 154, in particular a web plug-in proxy 210, sends a function call to web plug-in stub 218 via IPC channel 164. Then, web plug-in stub 218 makes the call to webpage rendering module 204.

Web plug-in delegate proxy 208 is used to communicate with plug-in process 154 via IPC channel 164. If web plug-in delegate proxy 208 does not have a handle to IPC channel 164, web plug-in delegate proxy 208 may request the handle. As mentioned earlier, web plug-in delegate proxy 208 may request the handle from plug-in process host 202 in browser process 166 via IPC channel 160. Using the handle, web plug-in delegate proxy 208 may transform function calls made to web plug-in 206 and web plug-in stub 218 to an IPC message. Web plug-in delegate proxy 208 sends the IPC message over IPC channel 164 to plug-in process 154.

IPC channel 164 may transmit data as a contiguous array of bytes. Each IPC message sent across IPC channel 164 may be set apart with an IPC header. The IPC header may define a message type, length of data contained in the message, and a routing identifier. The routing identifier may be used to specify a destination for a message within plug-in process 154.

When plug-in process 154 receives the IPC message from renderer process 152, plug-in process 154 uses data in the IPC message to make a function call to plug-in 156. As shown in FIG. 2, there may be multiple plug-in processes 154. Each plug-in process 154 executes a different plug-in. In an example, a renderer process 152 may access a different plug-in process to access different FLASH and ADOBE READER plug-ins. This configuration may increase stability because a first plug-in can continue operation in event of a crash in a second plug-in. In the example, the ADOBE READER plug-in may continue operation even after the FLASH plug-in crashes.

In addition to plug-in 156, each plug-in process 154 includes a plug-in instance 216. In an embodiment, plug-in process 154 may have multiple plug-in instances 216. If multiple pages (and hence multiple renderer processes 152) use the same plug-in (e.g. YouTube and Google Finance both using Flash), then plug-in process 154 hosts two plug-in instances 216. Similarly, if one page uses a plug-in multiple times (e.g. two Flash files on the same page) multiple plug-in instances 216 are used in the same plug-in process 154. This configuration decreases memory consumption. When plug-in process 154 receives an IPC message, plug-in process 154 may use a routing identifier in the IPC message to determine which plug-in instance of multiple plug-in instances 216 to route the message to.

When plug-in instance 216 receives an IPC message, plug-in instance 216 uses data in the IPC message to make a function call. Each plug-in instance 216 includes a web plug-in proxy 210, web plug-in delegate 212, and web plug-in delegate stub 214. Web plug-in delegate stub 214 receives the IPC message and unpacks the data. The web plug-in delegate stub 214 identifies a function to call and the function parameters. Then, web plug-in delegate stub 214 calls web plug-in delegate 212 with the function parameters.

Web plug-in delegate 212 makes the function call to plug-in 156. When plug-in 156 has completed the function call, plug-in 156 may return a value. The return value may be send back through web plug-in delegate stub 214, IPC channel 164, web plug in delegate proxy 208, and web plug-in 206 to webpage rendering module 204.

Plug-in 156 may also make a function call to access webpage rendering module 204. In that case, plug-in 156 calls web plug-in proxy 210. Web plug-in proxy 210 sends the function call to web plug-in stub 218 via IPC channel 164. Web plug-in stub 218 calls web plug-in 218. Finally, web plug-in 218 makes the function call to webpage rendering module 204. The operation of browser system 150 is described in more detail with examples with respect to FIGS. 3-4.

As mentioned earlier, there may be multiple plug-in processes 154, one for each plug-in. In another embodiment, a single plug-in process may execute multiple different plug-ins. For example, a single plug-in process may execute both a FLASH and ADOBE READER plug-ins. This embodiment may be less stable, but it also may be less taxing on system resources as fewer processes need be instantiated.

In the embodiment shown in FIG. 2, each plug-in process 154 has multiple plug-in instances 216. In an alternative embodiment, each plug-in instance may be in a separate plug-in process. This embodiment may require more system resources as more processes would have to be instantiated.

Also in the embodiment shown in FIG. 2, plug-in instance 216 is coupled with plug-in 156. While plug-in 156 implements a standard plug-in interface, there may be multiple standards that plug-in 156 could implement. For example, plug-in 156 could implement NPAPI or ActiveX. But, plug-in instance 216 must be able to understand the interface. For example, if plug-in instance 216 is developed to understand NPAPI plug-ins, it may not be able to access plug-ins implementing ActiveX. In an embodiment, a wrapper object may act as an intermediary between plug-in instance 216 and plug-in 156. The wrapper object translates function calls in one standard to another standard. In this way, a plug-in instance is developed to understand one standard (such as NPAPI) may be able to access plug-ins implementing another standard (such as ActiveX).

Each of browser process 166, renderer process 152, and plug-in process 154 may be implemented as a software process. As mentioned earlier, a process may be either a single sequential thread of execution or an instance of a program having multiple threads of execution.

Each of plug-in process host 202, webpage rendering module 204, web plug-in 206, web plug-in delegate proxy 208, web plug-in stub 218, plug-in instance 216, web plug-in proxy 210, web plug-in delegate 212, and web plug-in delegate stub 214 may be implemented as a software module.

Figure 3:
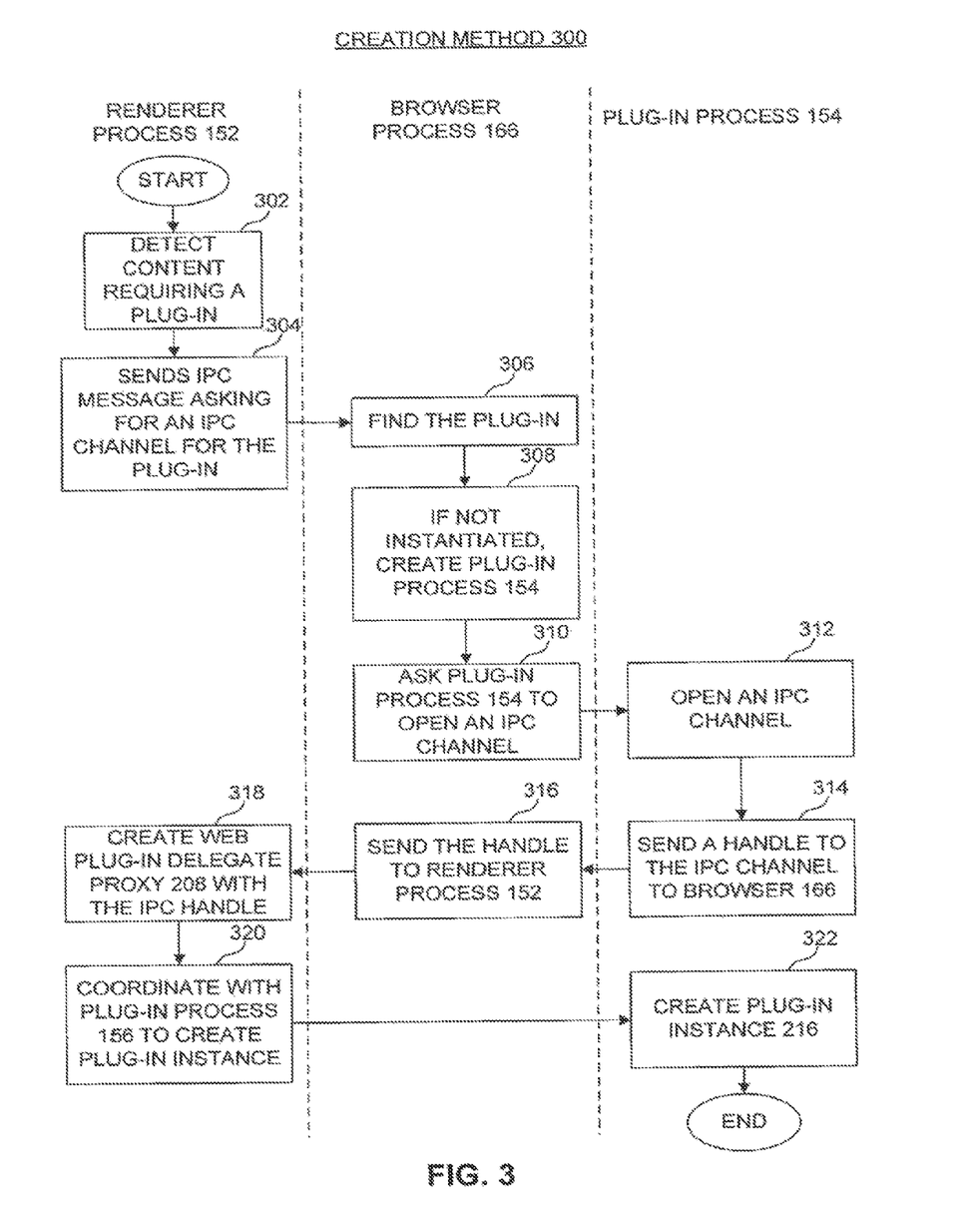
FIG. 3 is a flowchart showing a method for creating a connection to a plug-in process, which may be used in operation of the browser system in FIG. 1B.

FIG. 3 is a flowchart showing a method 300 for creating a connection to a plug-in process, which may be used in operation of browser system 150. Although method 300 is described with respect to components of browser system 150 for clarity, method 300 is not meant to be limited to browser system 150. Method 300 can operate in other environments as are known to those of skill in the art.

Method 300 begins when tenderer process 152 detects plug-in content in the web content received from browser process 166. The web content may be entirely plug-in content. For example, browsers frequently require a plug-in to interpret an ADOBE PDF file. An HTTP response received by browser process 166 includes a content type indicating that the web content is an ADOBE PDF file. The content type may be a Multipurpose Internet Mail Extensions (MIME) type. For an ADOBE PDF file, the content type may be "application/pdf".

In other examples, the web content may include plug-in content along with content, such as an HTML page, that can be interpreted and rendered without a plug-in. In an example, tenderer process 152 may detect plug-in content when interpreting and rendering an HTML page. The HTML page may have a tag, such as an "object" or "embed" tag. The tag may have a value that indicates a content type, such as "application/x-shockwave-flash". The plug-in content may occupy a portion of the HTML page as is commonly the case with a Flash file. Alternatively, the plug-in content may not occupy any portion of the page as may be the case with an audio file.

Using the content type in an HTTP response or in a value an HTML tag, renderer process 152 may recognize that it cannot interpret the file on its own, thus detecting plug-in content at step 302. At step 304, renderer process 152 sends an IPC message to browser process 166 requesting an IPC handle for the plug-in. An IPC handle may be necessary to communicate with plug-in process 154. As discussed earlier, the IPC message may include a header and data. The data in the IPC message requesting the handle may include the content type.

When browser process 166 receives the IPC message requesting the handle, browser process may first try to find the plug-in at step 306. At step 306, browser process 166 may determine what plug-in is required for a particular content type, such as "application/x-shockwave-flash". One possibility is that browser process 166 does not have an installed plug-in able to interpret the content type. In that event, browser process 166 may return an error message to renderer process 152. Another possibility is that a plug-in process for the required plug-in has already been instantiated, browser process 166 may proceed to step 310. A final possibility is that the browser has a plug-in installed that is able to interpret the content type, but a plug-in process to execute the plug-in has not yet been instantiated. In that case, browser process 166 may proceed to step 308. At step 308, browser process 166 instantiates plug-in process 154.

With plug-in process instantiated, browser process 166 sends a request to plug-in process 154 to open an IPC channel to renderer process 152 at step 310. The request may be sent in an IPC message. Browser process 166 may send the IPC message across an IPC channel connecting browser process 166 and plug-in process 154 such as IPC channel 162 in FIG. 2. A handle to IPC channel 162 may have been determined when plug-in process 154 was instantiated at step 308 or when the plug-in was found at step 306. A body of the IPC message may include the request.

In response to the request, plug-in process 154 may open an IPC channel to connect plug-in process 154 and renderer process 152, such as IPC channel 164 in FIG. 2, at step 312. Plug-in process 154 sends a handle to IPC channel 164 back to browser process 166 at step 314. Plug-in process 154 may send the handle to browser process 166 in an IPC message across an IPC channel 162 connecting browser process 166 and plug-in process 154.

Browser process 166 receives the handle to IPC channel 164 and sends the handle to renderer process 152 at step 316. With the IPC handle, renderer process 152 creates web plug-in delegate proxy 208 at step 318. Web plug-in delegate proxy 208 uses the handle to IPC channel 164 to communicate with plug-in process 156. Then, renderer process 152 coordinates with plug-in process 156 to create plug-in instance 216 at step 320. Step 320 may include using web plug-in delegate proxy 208 to send an IPC message to plug-in process 156.

Finally, plug-in process 154 creates plug-in instance 216 at step 322. Creating plug-in instance 216 may include creating web plug-in proxy 210, web plug-in delegate 212 and web plug-in delegate stub 214 in FIG. 2.

In this way, renderer process 152 coordinates with browser process 166 to establish a connection with plug-in process 154. Once the connection is established, renderer process 152 communicates with plug-in process 154 to execute any functions.

Figure 4:
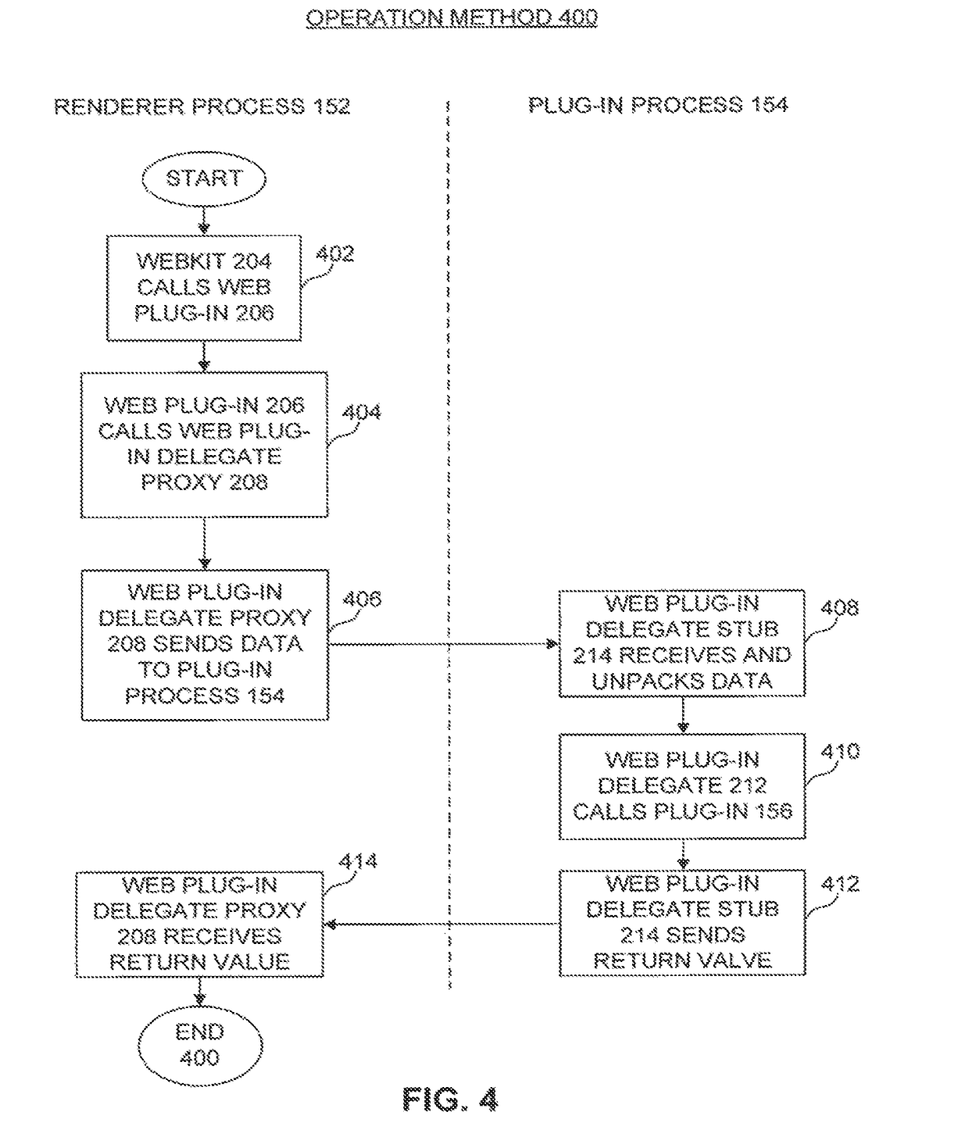
FIG. 4 is a flowchart showing a method for interacting with a plug-in process, which may be used in operation of the browser system in FIG. 1B.

FIG. 4 is a flowchart showing a method 400 for interacting with a plug-in process, which may be used in operation of browser system 150. For clarity, method 400 is described with respect to components in the system in FIG. 2. Method 400 is not meant to be limited to that system.

Method 400 may be used, for example, to execute a function call from webpage rendering module 204 to access a plug-in. In examples, function calls may be made to repaint a portion of the browser window, to scroll, in response to user input events such as keyboard and mouse inputs, and in response to a resize of a browser window.

Method 400 starts with webpage rendering module 204 in FIG. 2 calling web plug-in 206 at step 402. As mentioned earlier, web plug-in 206 may implement a specified plug-in interface so webpage rendering module 204 is unaware of the underlying processing required to access the plug-in in a different process. Web plug-in 206 calls web plug-in delegate proxy 208 at step 404. At step 406, web plug-in delegate proxy 208 sends data to plug-in process 154.

The data may be packaged in an IPC message sent over an IPC channel connecting renderer process 142 and plug-in process 154, such as IPC channel 164 in FIG. 2. The IPC message may include an IPC header with a routing identifier.

When plug-in process 408 receives the IPC message from renderer process 152, plug-in process 408 parses the message to determine the routing identifier. Based on the routing identifier, plug-in process 408 determines which plug-in instance to deliver the message to. In the plug-in instance, web plug-in delegate stub 214 receives and unpacks data from the IPC message at step 408. From the IPC message, the web plug-in delegate stub 214 determines which function call was made and any parameters for the function call. At step 410, web plug-in delegate 212 makes a function call to plug-in 156.

In response to the function call, plug-in 156 may return a value. At step 412, web plug-in delegate stub 214 may send the return value back to renderer process 152 via an IPC channel, such as IPC channel 164 in FIG. 2. In renderer process 152, web plug-in delegate proxy 208 receives the return value and possibly forwards it to webpage rendering module 204 at step 414.

By separating the plug-in from other browser operations, embodiments improve stability and security of a browser. Stability is improved because a crash in the plug-in does not spread to other portions of the browser. Further, security is improved because any potential malicious code is isolated from the remainder of the browser.

The Summary and Abstract sections may set forth one or more but not all exemplary embodiments as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system comprising:
    at least one processor configured to:
        execute a browser process that instantiates a renderer process to render web content, wherein the browser process communicates with the renderer process via a first inter-process communication channel;
        execute, separately from the browser process, the renderer process that detects plug-in content in the web content, and sends, to the browser process, a request for a handle of a second inter-process communication channel between the renderer process and a plug-in process, the second inter-process communication channel being separate from the first inter-process communication channel; and
        execute the plug-in process, separately from the renderer process and the browser process, that communicates with the renderer process to interpret the plug-in content using the inter-process communication channel, wherein the browser process instantiates the plug-in process if the plug-in process is not already instantiated and the browser process sends the handle to the renderer process, the browser process communicates with the plug-in process via a third inter-process communication channel that is separate from the first and second inter-process communication channels, and communications over the second inter-process communication channel bypass both the first and third inter-process communication channels.

2. The system of claim 1, wherein the browser process, upon instantiating the plug-in process, sends a request to the plug-in process to open the second inter-process communication channel with the renderer process, and
    the plug-in process opens the second inter-process communication channel responsive to receiving the request from the browser process, and sends the handle for the second inter-process communication channel to the browser process.

3. The system of claim 1, wherein at least one of the first second, or third inter-process communication channels is a named pipe.

4. The system of claim 1, wherein at least one of the first second, or third inter-process communication channels includes a shared memory.

5. The system of claim 1, wherein the renderer process comprises:
    a webpage rendering module that renders a portion of the web content and includes an interface adapted to access a plug-in;
    a web plug-in module that implements the interface; and
    a web plug-in delegate proxy module that uses the second inter-process communication channel to communicate with the plug-in process.

6. The system of claim 1, wherein the plug-in process includes two or more plug-in instances, wherein each plug-in instance is used to interpret at least a portion of plug-in content in the web content.

7. The system of claim 6, wherein the plug-in process includes two or more plug-ins.

8. The system of claim 1, further comprising:
a memory coupled to the processor, wherein the processor executes instructions to execute the browser process that instantiates the renderer process and the plug-in process.

9. The system of claim 1, wherein the browser process comprises a process host module that instantiates the renderer process and the plug-in process.

10. A method implemented on a computing device, comprising:
instantiating, by a browser process, a renderer process that detects plug-in content in content being rendered, wherein the browser process communicates with the renderer process via a first inter-process communication channel;
instantiating, by the browser process, a plug-in process, separate from the renderer process, wherein the browser process communicates with the plug-in process via a second inter-process communication channel that is separate from the first inter-process communication channel; and
facilitating, by the browser process, opening a third inter-process communication channel between the renderer process and the plug-in process, the third inter-process communication channel being separate from the first and second inter-process communication channels, and communications over the third inter-process communication channel bypassing both the first and second inter-process communication channels, wherein the browser process, the renderer process, and the plug-in process each comprise independent threads of execution.

11. The method of claim 10, further comprising:
calling a function associated with the plug-in process, the function determined based at least in part on data communicated between the renderer process and the plug-in process over the third inter-process communication channel.

12. The method of claim 11, further comprising:
sending, by the renderer process and to the browser process, a request for a handle to the plug-in process; and
sending, by the browser process to the renderer process, the handle to the plug-in process in response to the request.

13. The method of claim 10, further comprising instantiating two or more plug-in instances coupled to the plug-in process.

14. The method of claim 10, further comprising instantiating two or more plug-ins in the plug-in process.

15. The method of claim 10, further comprising sending data on the third inter-process communication channel from the renderer process to the plug-in process.

16. The method of claim 15, wherein the sending comprises storing, by the renderer process, the data on a shared memory coupled to the plug-in process.

17. A computer program product comprising instructions stored in a non-transitory computer-readable storage medium, the instructions comprising:
instructions to cause a browser process to instantiate a renderer process that detects plug-in content in web content, wherein the browser process communicates with the renderer process via a first inter-process communication channel;
instructions to cause the browser process to instantiate a plug-in process, separate from the renderer process, wherein the browser process communicates with the plug-in process via a second inter-process communication channel that is separate from the first inter-process communication channel; and
instructions to cause the browser process to facilitate establishing a third inter-process communication channel from the renderer process to the plug-in process, wherein the third inter-process communication channel is separate from the first and second inter-process communication channels and communications over the third inter-process communication channel bypass both the first and second communication channels.

18. The computer program product of claim 17, wherein the instructions further comprise:
instructions to cause the browser process to call a function associated with the plug-in process, the function determined based at least in part on data communicated over the third inter-process communication channel by the renderer process to the plug-in process.

19. The computer program product of claim 18, wherein the instructions further comprise:
instructions to cause the renderer process to send a request to the browser process for a handle to the plug-in process; and
instructions to cause the browser process to send, to the renderer process, the handle to the plug-in process in response to the request.

20. The computer program product of claim 17, further comprising:
instructions to cause the renderer process to render a portion of the web content that includes an interface adapted to access a plug-in; and
instructions to cause the renderer process to communicate with the plug-in process via the third inter-process communication channel.

21. The computer program product of claim 17, further comprising:
instructions to cause the browser process to instantiate two or more plug-in instances in the plug-in process, wherein each plug-in instances is coupled to the plug-in and is used to interpret at least a portion of plug-in content in the web content.

* * * * *

UNITED STATES PATENT AND TRADEMARK OFFICE
CERTIFICATE OF CORRECTION

PATENT NO. : 9,507,648 B1
APPLICATION NO. : 14/948178
DATED : November 29, 2016
INVENTOR(S) : John Abd-El-Malek et al.

Page 1 of 1

It is certified that error appears in the above-identified patent and that said Letters Patent is hereby corrected as shown below:

On the Title Page

Item (57), IN THE ABSTRACT:
Replace "one tenderer process" with --one renderer process--.

In the Specification

In Column 1, Line 56-57:
Replace "one tenderer process" with --one renderer process--.

In Column 4, Line 2:
Replace "tenderer process 152" with --renderer process 152--.

In Column 7, Line 50:
Replace "tenderer process 152" with --renderer process 152--.

In Column 7, Line 63:
Replace "tenderer process 152" with --renderer process 152--.

Signed and Sealed this
Thirtieth Day of July, 2019

Andrei Iancu
*Director of the United States Patent and Trademark Office*